United States Patent [19]

Gingras

[11] E Re. 31,502

[45] Reissued Jan. 17, 1984

[54] IN-LINE ENERGIZATION AND DE-ENERGIZATION OF AN EXTERNAL LOAD IN SERIES WITH AN EXTERNAL SOURCE OF ELECTRICITY IN RESPONSE TO EXTERNALLY SENSED PARAMETERS

[76] Inventor: Richard P. Gingras, 40 North St., Ridgefield, Conn. 06877

[21] Appl. No.: 932,758

[22] Filed: Aug. 10, 1978

Related U.S. Patent Documents

Reissue of:

[64] Patent No.: 3,974,426
Issued: Aug. 10, 1976
Appl. No.: 575,341
Filed: May 7, 1975

[51] Int. Cl.[3] ..... H01H 47/26

[52] U.S. Cl. ..... 361/170; 236/47; 236/68 B; 236/78 A; 307/308; 307/310; 307/311; 361/165; 361/175

[58] Field of Search ..... 361/165, 175, 188, 205; 236/683, 783, 14, 15, 91 C, 47; 307/117, 310, 311, 39, 252 P, 252 N, 252 R, 252 T, 252 Q; 219/494, 497, 501, 502, 505, 506, 507, 508, 510, 514, 515, 519; 363/125, 26; 323/22 T, 22 Z, 75 N

[56] References Cited

U.S. PATENT DOCUMENTS

| | | | |
|---|---|---|---|
| 3,149,224 | 9/1964 | Horne et al. | 219/505 X |
| 3,352,490 | 11/1967 | Dalzell et al. | 236/68 B |
| 3,408,506 | 10/1968 | Bergsma | 317/132 X |
| 3,503,261 | 3/1970 | Riester et al. | 323/75 N X |
| 3,716,188 | 2/1973 | Shulz | 236/78 A |
| 3,918,636 | 11/1975 | Dawson | 236/78 A |

FOREIGN PATENT DOCUMENTS

| | | | |
|---|---|---|---|
| 2218285 | 10/1973 | Fed. Rep. of Germany | 307/252 R |

OTHER PUBLICATIONS

"Transistor Power Supply has Overload Protection"--Ervin, Electronics, 6/20/58, pp. 74–75.

*Primary Examiner*—Harry E. Moose, Jr.
*Attorney, Agent, or Firm*—Mattern, Ware, Stoltz & Fressola

[57] ABSTRACT

A control system for energizing and de-energizing an external load in series with a source of electricity incorporates a rectifying network having inputs in series with the alternating current source and the external load. An electronic switch of the system activates the load by effectively shorting together the inputs to the control system when the combination of externally sensed parameters obtain predetermined magnitudes. The sensed parameters control the activation of the electronic switch by a plurality of control modules which interact with a control logic module, representing a Boolean combination of the control module outputs, so as to activate a trigger module which in turn causes the electronic switch, such as a silicon controlled rectifier (SCR) to be triggered. The external load is then energized by the SCR effectively shorting the inputs to the control system and which thus completes the electrical path from the source of electricity through the load. The control modules may optionally be connected to external control signals for their activation or de-activation and may also incorporate a hysteresis effect with respect to the sensed parameter. In a preferred embodiment of the present invention, the control system senses temperature and light, so as to override an existing furnace thermostat switch during the day and other times when the room is lighted and to return furnace control to the thermostat switch at some other, lower, temperature during the night-time when the lights in the room have been extinguished.

25 Claims, 5 Drawing Figures

IN-LINE ENERGIZATION AND DE-ENERGIZATION OF AN EXTERNAL LOAD IN SERIES WITH AN EXTERNAL SOURCE OF ELECTRICITY IN RESPONSE TO EXTERNALLY SENSED PARAMETERS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to control systems in series with an external load and an external source of electricity so as to energize and de-energize the external load with the external source of electricity depending upon the values of a plurality of sense parameters.

2. Description of the Prior Art

Although there are several prior art patents that disclose the use of electronic switches to effectively complete the connection of an external load to an external source of electricity, none of the prior art patents disclose a control system for sensing the combination of a plurality of external parameters and to thereby control energization and de-energization of the load in response to this combination of parameters by a control system in series with the external load and the external source of electricity. Thus, in U.S. Pat. No. 3,558,996, Mitchell, a circuit is disclosed in which a silicon controlled rectifier shorts out a full-wave bridge but which does not sense external parameters. U.S. Pat. Nos. 3,597,662, Gary, and 3,584,263, Thompson, also use a thyristor to energize an external device but do not disclose the use of remote sensors and control circuitry to energize a thyristor upon the external parameters reaching predetermined levels. Similarly, U.S. Pat. No. 3,553,535, Weber, does not teach the use of control circuitry to drive an electronic switch in response to externally sensed conditions.

Although other U.S. Patents disclose the electrical shorting of a full-wave rectifier bridge by a silicon controlled rectifier, none of these U.S. Patents disclose a control system in series with an external source of electricity and an external load so as to control the energization and de-energization of the load in response to the combination of a plurality of external sensed parameters. Thus, U.S. Pat. No. 3,818,247, Chambers et al, disclosed the use of a silicon controlled rectifier to control a load in response to a sensed condition, but the device is not in series with an external source of electricity. U.S. Pat. No. 3,818,183, Masson, discloses an electronic temperature control system utilizing an electronic switch but the disclosed system only senses one parameter, temperature. U.S. Pat. Nos. 3,708,738, Crawford et al, 3,691,404, Sweigert, Jr., 3,629,681, Gurwicz, 3,486,105, Breniere, 3,440,517, Page et al, 3,392,626, Miller et al, 3,365,654, Vollrath, 3,231,812, Paley, 3,331,013, Cunningham, and 3,146,392, Sylvan, all disclose electronic circuits utilizing a full-wave rectifier bridge and the effective shorting out of this bridge by an electronic switch, but none of these patents disclose the use of external sensors to control the operation of the electronic switch so as to activate the external load. U.S. Pat. 3,336,524, Healey also utilizes a full-wave bridge but this bridge is not in series with the source of electricity, and the electronic switches do not operate by sensing external parameters.

Although U.S. Pat. 3,365,654, Johnston discloses a full-wave bridge to control activation of a load in series with a source of electricity in response to an external sensor, only one sensor is disclosed and, in addition, the circuit is used for controlling the mean electrical power fed to a load rather than its activation or deactivation. Furthermore, Johnson utilizes an external oscillator for a portion of its control circuitry which incorporates a temperature sensing resistor. Thus, this portion of the control circuitry is not in series with the source of external electricity and the external load as is the present invention.

U.S. Pat. No. 3,783,368, Dosch et al, also discloses a control system in series with a source of external electricity and an external load so as to control the power to the external load. This patent discloses the use of a single sensor so as to control the average power to the external load. The use of a hysteresis effect for activation of the load is not disclosed and indeed, the purpose for the activation of the load is for controlling the duty cycle of the load. The present invention is not concerned with the varying duty cycle of the external load but its activation in response to a plurality of external sensed parameters. The activation of the external load of the present invention is thus used to control an external device such as a furnace, so as to maintain the furnace in operation until the external load is de-energized. Thus, the present invention is an on-off type of controller, rather than a proportional type controller disclosed in Dosch.

SUMMARY OF THE INVENTION

A control system of the present invention is in series with a load connected to a source of electricity for energizing and de-energizing the load in response to externally sensed parameters. The load must be in one of two states either a full ON state or a full OFF state depending upon the magnitudes of the externally sensed parameter and, optionally, the additional values of external control signals. The control system in one embodiment incorporates a full-wave rectifier electrically connected to the series combination of the external load and the external source of alternating electricity. The full-wave rectifier supplies electricity of one polarity to a direct current voltage regulator which generates an output of constant voltage to the control modules, the control logic modules, and sensors of the control system. The direct current voltage regulator incorporates circuitry which stores sufficient electrical energy to properly operate the control and control logic modules and sensors of the present invention even during the times when the electronic switch of the control system is activated.

The sensors of the present invention may be of any type that converts a sensed parameter to a direct current electrical signal either directly or with the aid of filters and detectors. Thus, in the preferred embodiment of the present invention a sensor monitors temperature while another sensor monitors ambient light. These sensors generate direct current electrical signals that are supplied to corresponding control modules. The control modules each generate a signal corresponding to an ON or OFF state depending on the value of the corresponding sensed parameter, or optionally, the value of an external control signal. These outputs of the control modules are transferred to the control logic module of the present invention. In the control logic module, the control module outputs are logically anded so as to produce an ON signal if, and only if, all of the control module output signals are ON and conversely to produce an OFF signal if any of the control module output signals is OFF.

The control logic output signal in turn controls the trigger module of the present invention which activates the electronic switch when the control logic output signal is in the ON state and turns off the electronic switch if the control logic output signal is in the OFF state. The electronic switch in the preferred embodiment of the present invention comprises a silicon controlled rectifier (SCR) which electrically short circuits the full-wave bridge when activated and thereby connects the external load to the external source of alternating current electricity. However, during each half cycle of the alternating current, a small amount of electrical energy is stored by the direct current voltage regulator so as to maintain the proper supply voltage to the control logic module, the control modules and the sensors. The voltage regulator may, of course, be replaced by a battery to supply the proper supply voltage.

In addition, the present invention incorporates one or more status indicators which are operable in one or two states depending upon the condition of the electronic switch. Thus, in the preferred embodiment of the present invention, a light emitting diode (LED) is deactivated when the silicon control rectifier is turned on and is activated when the SCR is turned off; thereby indicating to the user that the external load is not being activated by the control system.

Furthermore, in the preferred embodiment of the present invention, the temperature sensing control module incorporates a hysteresis-generating circuit which maintains the output of this particular control module in the ON state even though the sensed temperature is below the value which is initially required to generate the ON signal. This temperature swing, which is therefore necessary to make the control module transfer to the OFF state simulates the bimetallic thermostat switch that the temperature sensor is simulating. Thus, when the ambient light in the room indicates that the room is lighted, the control system of the present invention overrides the existing temperature activated bimetal thermostat switch of the furnace control. Thus, the temperature of the room is selectable by the temperature setting of the temperature sensor of the present invention. However, if the ambient light indicates that the room is dark—indicating that no one is occupying the particular room or area—the control system is deactivated and the temperature sensor is no longer able to activate the electronic switch. At this time, the existing temperature activated thermostat switch controls the furnace temperature, and this switch may preferably be maintained at a lower temperature than the temperature as set by the temperature trim setting of the present invention's temperature sensor;thereby saving on the use of energy during the dark hours of every day.

OBJECTS OF THE INVENTION

Therefore, it is a principal object of the present invention to provide a control system in series with an external load and an external source of electricity for energizing and de-energizing the load with the external source of electricity in response to the combination of a plurality of sensed parameters.

An additional object of the present invention is to provide a control system of the above description which incorporates control circuitry which is supplied by electricity from the external source of electricity at all times including when the control system energizes the external load.

A further object of the present invention is to provide a control system of the above description for use with an existing temperature activated or other automatic or manual external switch so as to override the control of this temperature activated switch during times when the room in which the control system is located has a predetermined amount of ambient light.

An additional object of the present invention is to provide a control system of the above description which may incorporate indicators for showing to the user the particular state of the control system.

A further object of the present invention is to provide a control system of the above description which may additionally be responsive to externally generated control signals for activating the control system.

An additional object of the present invention is to provide a control system of the above description that has a very low power consumption so as to maintain the external load in the OFF state when the electronic switch of the present invention is in the OFF state even though a small amount of power is being used by the present invention to maintain operating power to a portion of its electronic circuitry.

Other objects of the present invention will in part be obvious and will in part appear hereinafter.

THE DRAWINGS

For a fuller understanding of the nature and objects of the invention, reference should be had to the following detailed description taken in connection with the accompanying drawings.

DETAILED DESCRIPTION

Figures 1, 3A, 3B, 3C:
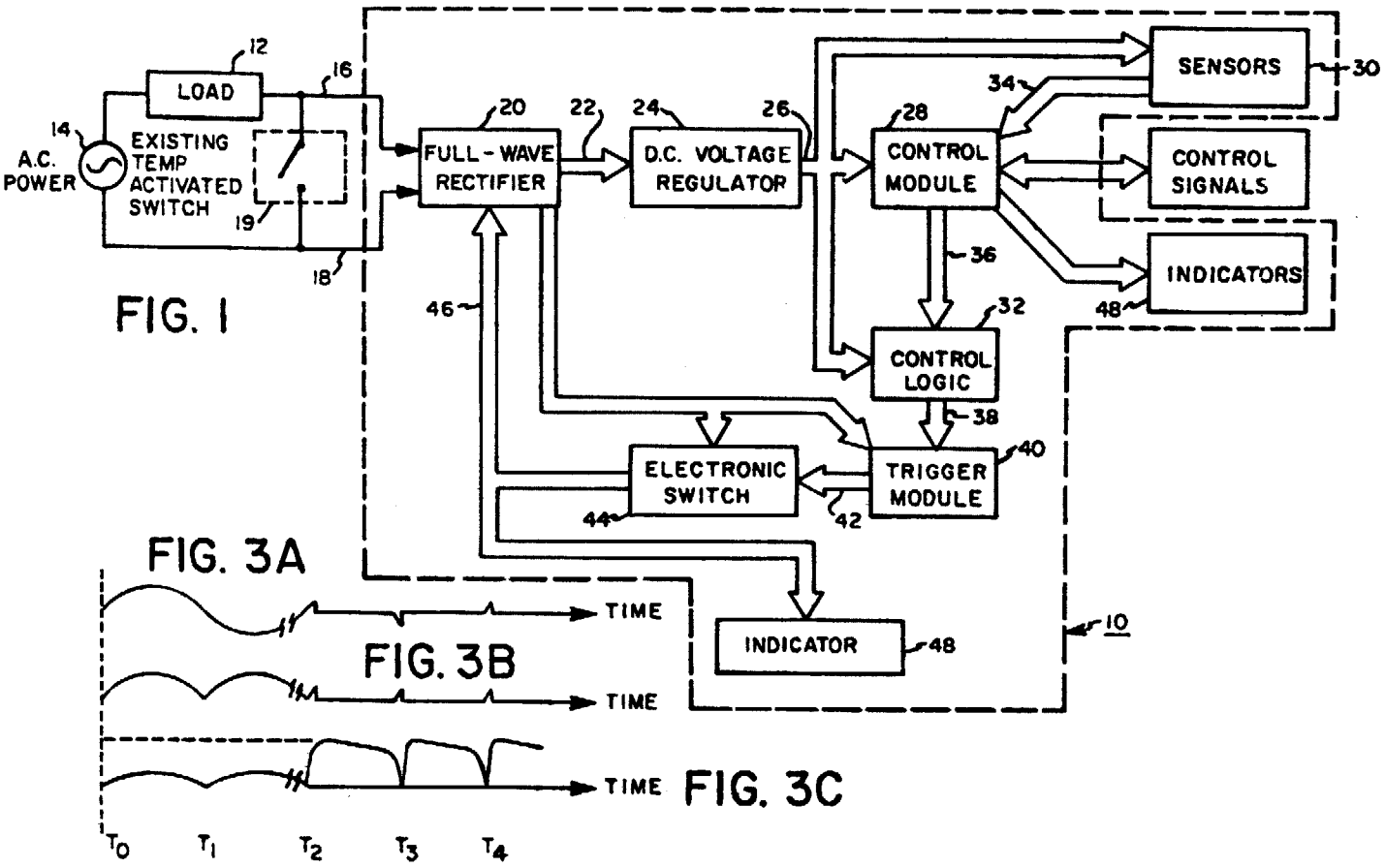
FIG. 1 is a block diagram of the present invention showing its interconnection with an external source of alternating electricity as well as an external load and an existing temperature activated thermostat switch.
FIG. 3A is a voltage waveform across the inputs to the present invention.
FIG. 3B is a voltage waveform across the output terminals of the full-wave rectifier of the present invention.
FIG. 3C is a voltage waveform across the gate of the electronic switch.

As may best be seen in FIG. 1, a control system 10, of the present invention incorporates a number of electronic circuit modules 20, 24, 28, 30, 32, 40, 55, and 48 for performing the energization and de-energization of an external load 12 in series with an external source of electricity 14 by effectively completing the electrical connection of the load to the external source of electricity. The activation of the load is from an OFF state to an ON state so that the present invention is in effect an ON-OFF type of control system. Furthermore, the present invention is in series with the external load and the external source of electricity and performs its controlling function by effectively electrically short-circuiting the input lines 16 and 18 that emanate from the load 12 and the power source 14. In one configuration, the load is a relay and its normal energization and de-energization by an external temperature activated thermostat switch 19 is overriden at certain times by the present invention. In this configuration, the electricity source 14 is approximately 24 VAC, and is typically the secondary side of a 115 VAC step-down transformer.

In the preferred embodiment of the present invention, a full-wave rectifier module 20 receives alternating electricity from the external source of electrical power *14 in series with a load 12* and rectifies this alternating source of electricity so as to yield an output 22 of pulsating direct current electricity. This output is connected to a direct current voltage regulator module 24 which produces a regulated constant output 26 of direct current voltage at a predetermined level, preferably 6 VDC. This module incorporates electrical energy storage for maintenance of this direct current voltage during times when the output 22 of the full-wave rectifier module 20 is short-circuited.

As seen in FIG. 1, the output 26 of the direct current voltage regulator 24 supplies power to the control modules 28, the sensors 30, and the control logic module 32. The sensors 30 monitor external parameters such as temperature [and], light, *humidity, time, or pressure,* and generate an electrical sensor output signal 34 proportional to the externally sensed parameter. These outputs 34 control the ON and OFF state of respective control modules 28. Thus, if the sensed external parameter is greater than a predetermined adjusted value, the output 34 of the sensor 30 will cause the corresponding control module 28 to generate a control module output 36 which will go from an OFF state to an ON state are electrically transferred to the control logic module 32 where, if all of the outputs 36 are in the ON state, the control logic will generate a control logic output 38 that is also in the ON state and in all other situations generate a OFF output signal. It is apparent to one skilled in the art, that the control logic module may logically combine the outputs of the control modules in other ways to generate an ON or OFF control logic signal. Thus, the output of the control logic module may be equated to its inputs by a Boolean equation. For instance, the control logic output 38 could be maintained in the ON state for all control module input signals except when all these signals are in the OFF state.

The output 38 of the control logic module 32 is electrically transferred to a trigger module 40 where, if an ON output signal is received, a trigger output signal 42 is generated that will periodically energize an electronic switch 44. The energization of the electronic switch causes the output of the electronic switch 46 to effectively short-circuit the full-wave rectifier 20 for the majority of every half cycle of alternating current electricity entering the full-wave rectifier bridge via input lines 16 and 18. Thus, the electronic switch causes the external load 12 to be fully energized by the external source of electricity 14 and thereby cause the load 12 to go from the OFF state to the ON state. The electronic switch also may energize or de-energize an indicator 48 so as to inform the user of the status of the controller.

Figure 2:
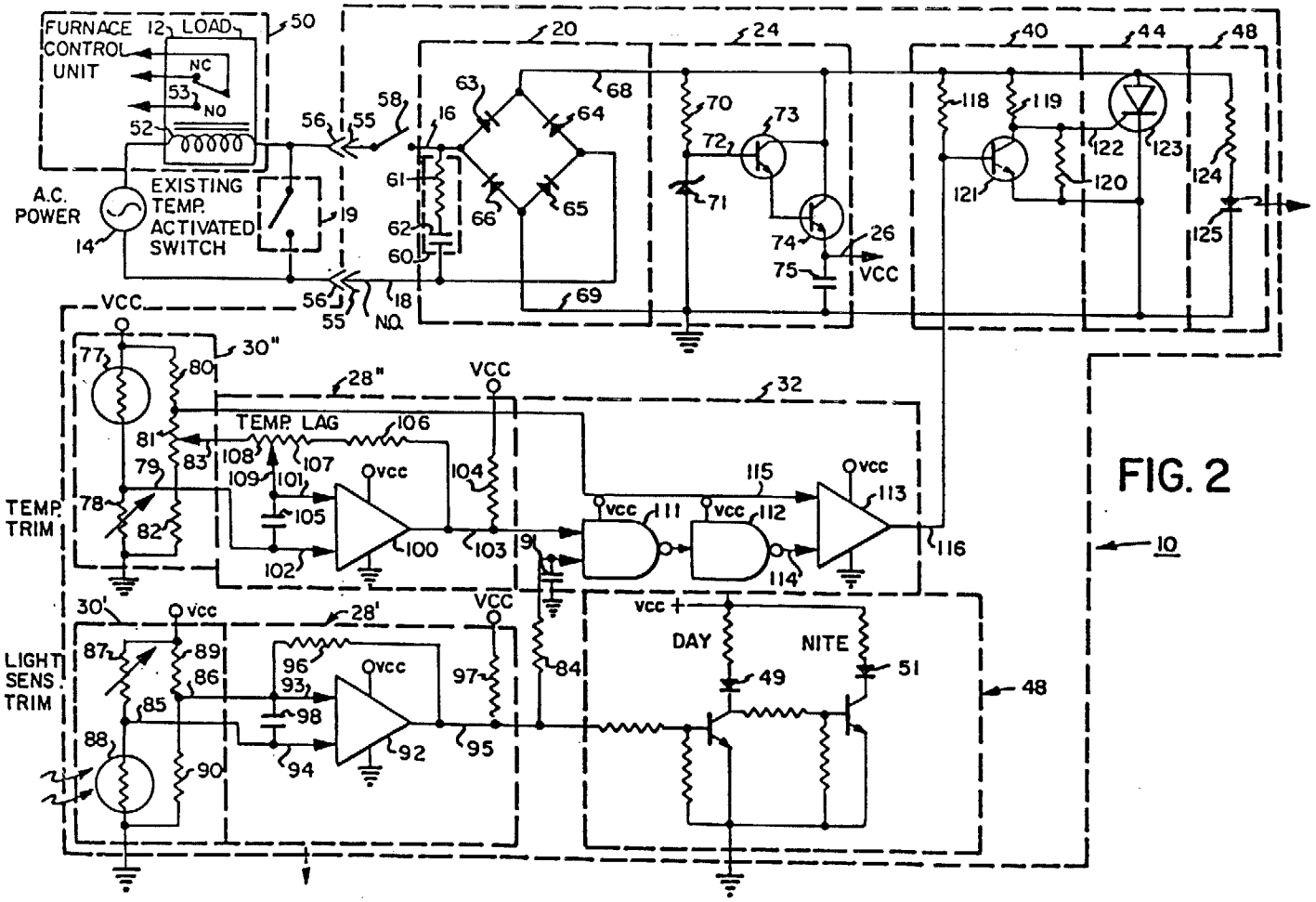
FIG. 2 is a schematic diagram of the control system shown in FIG. 1.

As best seen in FIG. 2, the preferred embodiment of the present control system 10 is adapted for providing overriding control to a temperature control unit 50, which may be a furnace or an air-conditioner, by activating a relay 52 representing the external load to the control system. The output of the relay may be two or three wires depending upon the particular furnace to be controlled. Thus, in a standard furnace control unit, a thermostat switch 19 closes if the ambient temperature equals a predetermined set temperature. The closure of the thermostat switch closes the electrical circuit from the source of alternating current electricity 14 to the furnace relay 52 thereby energizing the relay to close its normally open contact 53, and thereby energize the furnace control unit.

The present control system connects in parallel relationship to the existing temperature activated thermostat switch 19 by means of male-female connectors 55 and 56. A switch 58 allows deactivation of the control system from the thermostat switch 19 during times when it is not desired for the control system to be operable, such as during prolonged absence from the area serviced by the furnace.

The full-wave rectifier 20 is connected across input lines 16 and 18 from the switch 58 and the male connector 55. A snubber circuit 60 is connected across input lines 16 and 18 and comprises resistor 61 and capacitor 62. The electrical values for these and all subsequent passive circuit elements are listed in Table 1. The snubber circuit prevents rapid changes in voltage, that dv/dt, and thereby prevents turn-on of the electronic switch 44 during times when it is not being triggered by trigger module 40.

TABLE 1

| Reference Numeral | Component Type | Value |
|---|---|---|
| 44 | Electronic Switch (SCR) | 2N5061 or 2N2324 |
| 61 | Resistor | 62 ohm |
| 62 | Capacitor | .68 μfd |
| 70 | Resistor | 1K |
| 73, 74 | Transistors | 2N1613 |
| 75 | Capacitor | 1000MF. 16v |
| 77 | Thermister | 05DC203K (RODAN) |
| 78 | Potentiometer | 50K |
| 80 | Resistor | 22K |
| 81 | Potentiometer | 10K |
| 82 | Resistor | 22K |
| 84 | Resistor | 4.7 meg |
| 87 | Potentiometer | 500K |
| 88 | Photoresistor | CL605L (CLAIREX) |
| 89 | Resistor | 33K |
| 90 | Resistor | 33K |
| 91 | Capacitor | 15 μfd |
| 96 | Feedback Resistor | 560K |
| 97 | Biasing Resistor | 56K |
| 98 | Capacitor | .01 μfd 10v |
| 104 | Biasing Resistor | 56K |
| 105 | Filter Capacitor | .01 μfd 10v |
| 106 | Feedback Resistor | 4.7M |
| 107 | Feedback Potentiometer | 100K |
| 118 | Resistor | [10K] *100K* |
| 119 | Resistor | [100K] *27K* |
| 120 | Resistor | *1K* [27K] |
| 121 | Transistor | 2N 2319 |
| 124 | Resistor | [1K] *10K* |

The full-wave rectifier comprises a bridge diode circuit comprising diodes 63, 64, 65 and 66 which generate a unipolarity electrical output 22 on lines 68 and 69.

The direct current voltage regulator 24 receives the output from the full-wave rectifier bridge and produces a regulated direct current voltage output 26 (VCC), preferably having a value of 6 VDC, which is connected to the sensors 30, control modules 28 and the control logic module 32 so as to properly bias these portions of the control system. The direct current voltage regulator comprises resistor 70 connected to zener-diode 71 so as to produce a voltage on line 72 in order to bias Darlington transistor pair 73 and 74 thereby produce the regulated DC voltage output 26 across capacitor 75. Capacitor 75 has sufficient electrical storage capabilities so as to maintain the desired output voltage VCC) on output 26 during times when the output line 68 of the full-wave rectifier is effectively equal to the potential on line 69. This condition arises when the electronic switch 44 of the present invention effectively short-circuits the rectifier bridge as will be explained more fully later.

The sensors 30 measure external parameters and produce electrical signals in response thereto. Thus, a temperature sensor module 30'' is shown which measures ambient temperature. This module comprises a thermistor 77 having a decreasing resistance as the ambient temperature increases. The thermistor is connected to a potentiometer 78 and their output 79 is connected to the corresponding control module 28. The temperature sensor also incorporates resistors 80 and 82 and potentiometer 81 in parallel with the series combination of thermistor 77 and potentiometer 78, the total combination forming an electrical bridge. A portion of the voltage across potentiometer 81 is sensed and transferred to the corresponding control module by output line 83. The potentiometer 78 in the temperature sensor allows the user to manually set the temperature which the user desires to have when control system override the existing thermostat switch. Thus, if the temperature trim potentiometer 78 was set at 70° F. and if the other sensors were equal to their predetermined levels for activation, the control system will then effectively connect the thermostat relay 52 to the alternating current source 14, thereby energizing the furnace control heating unit. It is thus seen that the particular setting of the existing thermostat switch 19 is completely ignored by the control system during such times, and thus the control system in effect overrides the existing thermostat. It should be noted that a second temperature sensor and control module may be used to sense a second predetermined temperature so as to eliminate the existing temperature activated switch 19.

As also seen in FIG. 2, a light sensor module 30' is utilized for monitoring ambient light. This sensor generates an electrical voltage across output lines 85 and 86 which are connected to a light control module 28' so as to activate this module if the ambient light is greater than a selected predetermined value. This light sensor comprises a potentiometer 87 which is used to adjust the level of ambient light necessary for activating the control system. Connected in series with the potentiometer is a photo-resistor 88 which varies its internal resistance in inverse proportion to an increase in the ambient light level. Connected in parallel to the potentiometer and photo-resistor series combination is a pair of resistors 89 and 90, the combination forming an electrical bridge. Thus, as the ambient light increases, the photo-resistor internal resistance 88 decreases, and the voltage polarity between output lines 85 and 86 switches from output line 85 positive to output line 86 positive.

As also shown in FIG. 2, the light sensor module 30' connects to light control module 28' which comprises an operational amplifier 92 with inputs 93 and 94 and output 95 which is connected to the logic module 32 as well as feedback resistor 96 and biasing resistor 97. A capacitor 98 is connected across input lines 93 and 94 for filtering purposes. Thus, during low ambient light conditions, the output line 85 is at a higher potentional than output line 86 and therefore operational amplifier 92 is maintained in the OFF state. However, as the ambient light increases, the internal resistance of the photo-resistor decreases thereby causing output line 85 to have a lower potential than output line 86. When this change in voltage polarity occurs, the inputs 93 and 94 to the operational amplifier are such that the negative input 94 is more negative than the positive input 93. At this time, the operational amplifier 92 switches to the ON state, which in the present case is the VCC voltage from output line 26 of the DC voltage regulator module. This increased voltage on output line 95 passes current through feedback resistor 96 thereby making the potential between input lines 93 and 94 greater and thereby saturating the operational amplifier into the state.

A time delay circuit may be incorporated in the light control module 28' in order to prevent activation of the system by rapid turn on and turn off of a light bulb near the light sensor, such as by resistor 84 and capacitor 91 RC combination. Indeed, potentiometer 87 may be adjusted so as to set the level of ambient light necessary for initial activation of the light control module 28'.

The temperature control module 28'' operates in an analogous fashion to the light control module 28' connected to the light sensor module 30'. Thus, this control module also incorporates an operational amplifier 100 having input lines 101 and 102 and output line 103 as well as biasing resistor 104 and filter capacitor 105. The feedback network of this operational amplifier is slightly different than the light sensing control module in that a hysteresis temperature effect is incorporated in the feedback network. The feedback network comprises resistor 106 and potentiometer 107. As will be noticed, potentiometer 107 connects to resistor 81 at one point and the output of the potentiometer is connected to input line 101 and capacitor 105. Thus, the output line 103, which is connected to the control logic module 32, is in the OFF or low voltage state when input line 102 is at a greater potential than input line 101.

Thus, when the ambient temperature is low, the internal resistance of the thermistor 77 is high thus making output line 79 at a lower potential than line 83. However, as the ambient temperature increases, the internal resistance of thermistor 77 decreases causing output line 79 to have a higher potential than output line 83. At this time, the operational amplifier 100 is turned to the [ON, or higher voltage state, having an output voltage equal to the VCC voltage of output line 26 of the DC voltage regulator] *OFF, or lower voltage state, having an output voltage equal to zero volts.* Also, at this time, the feedback network causes input line 101 to be at an even higher potential than input line 102, thus saturating operational amplifier 100. The hysteresis effect is caused by the voltage drop of the outer leg 108 of the feedback potentiometer which is connected to the output line 83 of the temperature sensor. Thus, the voltage on the temperature sensor output line 83 may decrease by an amount equal to the voltage drop across outer leg 108 without having any effect on the turn-on of the operational amplifier. Indeed, the output line 83 must have a negative potential with reference to output line 79 of sufficient magnitude to cause the feedback current from the feedback network comprising resistor 106 and potentiometer 107 to prevent this feedback from biasing input line 101. At this time, the input line 101 will be at a lower potential than input line 102 and the operational amplifier will revert to its OFF state.

The hysteresis feedback potentiometer 107 is able to adjust the hysteresis effect from less than ½ of 1° F. to greater than 2° F. depending upon whether the potentiometer pickup point 109 is set at a minimal value closest to output line 83 or set at a maximum value closest to resistor 106.

Outputs 95 and 103 of the control modules are connected to the control logic module 32. The control logic module performs a logical AND operation on these outputs. The control logic module includes nand gates 111 and 112 as well as operation amplifier 113. The output of nand gate 112 is connected to the minus input 114 of the operational amplifier. The plus input 115 of the operational amplifier is connected to the junction between resistor 80 and potentiometer 81 of the temperature sensor 30 and thus, this voltage has a positive value less than the VCC voltage of output line 26. Since the output of nand gate 112 is at the ON or VCC voltage when the inputs from output lines 95 and 103 are both in the ON state, the output of operational amplifier 113 is in the [high or ON] *low or ON* state only when the outputs of the control of all the control modules are in the ON state. At other times, the output of nand gate is at the low potential and thus the voltage from the junction of resistor 80 and potentiometer 81 is at a higher potential thereby maintaining the operational amplifier 113 in the OFF (*VCC*) state.

The output line 116 of the operational amplifier 113 is connected to the trigger module 40. Trigger module 40 comprises resistors 118, 119, and 120 as well as transistor 121. Thus, when output line 116 is in the OFF or [low] (*VCC*) voltage state, the transistor 121 is [saturated] *non-conducting*. The collector of transistor 121 is connected to the gate terminal 122 of a silicon controlled rectifier 123 which comprises the electronic switch of the present invention. Thus, during the times when transistor 121 is saturated ($VCE_{SAT} \times 0.2\ V$), the collector voltage is substantially at ground potential thereby preventing the electronic switch from firing.

However, when the output line 116 of the control logic module is in the ON or [high] *low* state, the transistor 121 is turned OFF thereby making the collector voltage of that transistor high and thereby energizing the gate terminal 122 of the electronic switch [causing] *when the voltage across lines 68 and 69 equals approximately 16.8 volts, which corresponds to a trigger voltage at the gate 122 of SCR 123. This is the voltage across resistor 120 when the gate terminal reaches a voltage of 0.6 volts* the silicon controlled rectifier [to act] *acts* as a low impedance path for the remainder of the applied alternating half cycle of current. This in turn effectively electrically connects output lines 68 and 69 of the full-wave rectifier bridge which in turn effectively electrically connects input lines 16 and 18, thereby activating the load 12 by the alternating current source 14. A waveform of the gate voltage of the silicon controlled rectifier is shown in FIG. 3C where the gate voltage is in the OFF state from T$\phi$ to T2 and is activated from T2 to beyond T4. FIG. 3A shows the corresponding waveform across input lines 16 and 18 of the control system. Thus, up until the time when gate 122 is activated, the input to the full-wave rectifier bridge is equal to the alternating current source 14. FIG. 3B shows the corresponding waveform across the outputs 68 and 69 of the full-wave rectifier bridge. Thus, it is seen in FIGS. 3A, 3B, and 3C that the [alternating] *operational* current source is not energizing the load 12 until time T2 and that from time T2 to beyond time T4 the external load is being energized since the output of the full-wave rectifier bridge (FIG. 3B) is effectively electrically shorted for the majority of each half cycle of alternating current. The full-wave rectifier in turn effectively electrically connects input lines 16 and 18 during these times.

An indicator module 48 is connected across the electronic switch 44. The indicator module comprises resistor 124 and light emitting diode (LED) 125. The LED is activated when SCR 123 is not triggered, thereby indicating that the control system is not overriding the external thermostat switch. The LED is de-activated when the SCR fires, thus indicating that the system is energizing the external load.

It should also be noted that during times when the electronic switch is energized; i.e., when the output of line [116] *122* is in the high state, a small voltage does appear across the full output of the full-wave rectifier as shown in FIG. 3B. This small amount of voltage during a small portion of each half cycle of alternating current provides the additional electrical energy needed to maintain the output 26 of the direct DC voltage regulator at its desired level. The reason that such a small voltage for such a small period of time during each half cycle of the alternating current source is sufficient to maintain the VCC voltage at this desired level is due to the low power consumption of the control electronics of the sensors 30, the control modules 28 and the control logic module 32. Typically, 10 to 30 milliamperes at the VCC voltage of 5 VDC is sufficient to maintain the proper operation of these modules. Furthermore, the full-wave rectifier bridge is not electrically shorted at the beginning of each half cycle of applied alternating current because the applied voltage across output lines 68 and 69 of the full-wave rectifier must obtain a voltage sufficient to trigger the gate terminal 122 of the silicon controlled rectifier 123. This voltage is typically 0.8 of a volt] *through the voltage divider network of resistors 119 and 120. This voltage is typically 0.6 volt, which is reached when the voltage across output lines 68 and 69 reaches 16.8 volts.*

Thus, the present invention not only controls the external load in response to the externally sensed parameters, but it also maintains proper operating voltages for its control electronics even when the control system is energizing the external load.

Furthermore, due to the fact that the power consumption of the control electronics of the control system is in the milliwatt range when CMOS integrated circuits are utilized for the operational amplifiers 92, 100, and 113, and logic gates 111 and 112, the current drain by the control system is insufficient to activate the external load 12. Typically, to activate relay 52, a current of more than 300 milliamperes is required while the control electronics only requires approximately 10 milliamperes.

Thus, the control system is able to override an existing temperature activated thermostat switch 14 in a furnace control unit so as to maintain the ambient temperature at some desired range during times when the ambient light indicates that the room is lighted and therefore in use. Furthermore, during the nighttime, when the light sensor of the present invention indicates that the higher ambient temperature is no longer desired, the control system reverts control back to the existing temperature activated thermostat switch 19 which may therefore be set at a low temperature.

It should be noted that the present invention when connected to a furnace control unit, is able to reduce the consumption of fuel by automatically maintaining the nighttime temperature at a predetermined, lower level, than daytime temperature for the dwelling heated by the furnace. The present invention is superior in operation to other fuel-saving devices for furnaces since it will not de-activate at night while the lights are on. The other fuel-saving devices utilize timers that connect a second thermostat switch or readjust an existing thermostat to a lower setting, or to activate a smaller heater under an existing thermostat so as to lower the dwelling temperature. The timers in all these devices must be reset every time the occupants of the dwelling are awake beyond their normal bedtimes, or else the nighttime setting of the device will take over.

It is readily apparent that the present invention may also be used to sense other parameters such as air pressure, hot water temperature, sound, or any other parameter that may be electrically sensed to control a variety of external loads which have an ON or Off type desired control. Thus, the present invention may be used not only to control furnace or air-conditioner control units but may also be used to control any type of device utilizing an on-off type of activating unit or solenoid.

It should also be noted that the present invention may also be used with a direct current source of electricity by simply connecting input line 16 to output line 68 and connecting input line 18 to the ground output line 69 while eliminating the full-wave rectifier bridge. In this configuration, an oscillator is built into the control electronics that allows the power supply to "sample" power; thereby maintaining a charge on capacitor 75. In addition, a transistor may be used in place of the SCR 125. Furthermore, external control signals may optionally communicate with some or all of the control modules to change their states.

Thus, what has been described is a control system for use in series with an external load as well as an external source of electricity so as to energize or de-energize the external load in response to the combination of a plurality of sensed parameters. The sensed parameters may be temperature, ambient light, pressure, sound, or any other parameter which may be converted into an electrical signal.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A control system for controlling the energization and de-energization of a load in series with a source of alternating current electricity in response to at least two external parameters, comprising:

A. means, (*20*), having input terminals connectable across the load and the alternating current electricity source series combination, for rectifying the alternating current electricity [at] *and applying the rectified alternating current electricity to* a pair of output terminals;

B. means, (*24*), connected to the output terminals of the rectifying means, for voltage regulating a portion of the output of the rectifying means;

C. means, (*30*), connected to the output of voltage regulating means for *sensing external parameters and for* generating [an] electrical [signaling response] *signals, each signal having a magnitude proportional* to *one of the* sensed external parameters;

D. means, (*28*), each connected to one of the sensing means and *to* the voltage regulating means, for generating electrical control output signals that are of a first, ON, value if the sensed parameter is greater than a predetermined value and is a second, OFF, value if the [sense] *sensed* parameter is otherwise;

E. means, (*32*), connected to the output of all the *electrical* control [modules,] *output signal generating means,* for generating a control logic output signal that is of a first, ON, value [if and] only if all of the *electrical control* output signals [of the control signal means] are of an ON value and is a second, OFF, value if any *electrical control* output signal [of the control signal means] is of an OFF value;

F. [triggering means having an input] *a trigger* (*40*) *comprising means* connected [to] *across* the output [of the control logic signal] *terminals of the rectifying* means, [for generating a trigger voltage signal if and only if] *having an output controlled by the output of* the control logic [means] output [signal] *signals, so as to have a fixed nearly ground voltage when the control logic output signal is OFF and a voltage equal to a percentage of the voltage across the output terminals of the rectifying means when the control logic output signal* is [of an] ON [value]; and G. means, (*44*), having [an] *a gate* input connected to the *output of the* trigger [voltage signal of the triggering means], and connected across the output of the rectifying means, for effectively electrically connecting the input terminals of the rectifying means [if a trigger voltage signal is present] *only after and for the alternating current half cycle when the output of the trigger obtains a predetermined value*, and for effectively disconnecting the input terminals of the rectifying means from each other [if the trigger voltage signal is not present] *at all other times*;

whereby the load is energized by the alternating current electricity source if the sensed external parameters are all greater than their respective selected predetermined values, and the load is de-energized if any of the sensed external parameters are not greater than their respective predetermined values.

2. A control system as defined in claim 1, further comprising:

H. [indicators] *an indicator*, connected to the [output of the electronic switch] means, for *effectively electrically connecting the input terminals of the rectifying means*, for indicating the ON or OFF state of the control system.

3. A control system as defined in claim 2, wherein the [indicators comprise] *comprises a* light emitting [diodes] *diode*.

4. A control system as defined in claim 1, wherein the [electronic switching] means for effectively electrically connecting the input terminals of the rectifying means incorporates a silicon controlled rectifier.

5. A control system as defined in claim 1, wherein each sensing means comprises an electrical bridge incorporating a parameter variable resistor, a potentiometer connected in series with the parameter variable resistor for selecting the predetermined value for the sensed parameter, and [a resistor] *at least two resistors having an output positioned somewhere therebetween, the resistors* connected in parallel to the series combination of the variable resistor and the potentiometer [parallel combination of a first] *the* resistance *of the bridge and the output proportioned* [and a potentiometer, the resistance] *to the magnitude* of the [sensed] external parameter [determined by the magnitude of the external parameter], wherein the electrical signal of the sensing means is proportional to the variation in resistance of the variable resistor.

6. A control system as defined in claim 1, wherein each *electrical* control output *signal generating* means incorporates an operational amplifier for sensing the electrical signal from the corresponding sensing means and generating an output signal in response thereto.

7. A control system as defined in claim 1, wherein the *means for generating a* control logic means logically ANDS *output signal* the control output signals of the *electrical* control *output signal generating* means.

8. A control system as defined in claim 1, wherein the rectifying means comprise a full-wave bridge.

9. A control system as defined in claim 1, wherein the voltage regulating means comprises a zener diode connected to the input of a Darlington transistor pair and wherein the output of said Darlington transistor pair is connected to a capacitor for storing electrical energy.

10. A control system for controlling the energization and de-energization of a relay load in series with a source of alternating current electricity in response to ambient light and ambient temperature, so as to override the control of an existing temperature activated switch connected across the series combination of the relay load and the alternating current source, comprising:

A. means, having input terminals connectable across the load and the alternating current electricity source series combination and in parallel with the external temperature activated switch, for rectifying the alternating electricity *present at the input terminals* at a pair of output terminals;

B. means, connected to the output terminals of the rectifying means, for voltage regulating a portion of the output *of the* rectifying means at a predetermined value and storing electrical energy at the regulated voltage value;

C. light sensing means, connected to the output of the voltage regulating means, for generating an electrical output signal in proportion to the ambient light level;

D. temperature sensing means, connected to the output of the voltage regulating means, for generating an electrical output signal proportional to the ambient temperature;

E. light control means, connected to the output of the light sensing means, and the voltage regulating means, for generating an electrical control output signal of a first, ON, state if the ambient light is above a first predetermined value and a second, OFF, state if the ambient light is below said first predetermined value;

F. temperature control means, connected to the output of the temperature sensing means, and the voltage regulating means, for generating a first, ON, signal if the ambient temperature is above a second predetermined value and a second, OFF, signal if the ambient temperature is below a third predetermined value;

G. control logic means, connected to the [output] *outputs* of the light control means and the temperature control means for generating an ON signal if the outputs of the light control means and the temperature control means are both in the ON state and for generating an OFF signal if either the temperature control output signal or the light control output signal is in the OFF state;

H. [triggering means, having an input connected to] *a trigger comprising:*

(*1*) *a transistor controlled by* the output of the control logic means, [for generating a trigger voltage signal if, and only if,] *and*

(*2*) *a voltage divider controlled by the output of the transistor and having at least a pair of resistors connected in series across the output terminals of the rectifying means, having an output at one junction of the resistors, the output of the trigger equal to a fixed percentage of the voltage across the voltage divider when the output of* the control logic means [output signal] is [in the] ON [state]; and I. electronic switching means having an input connected to the [trigger voltage] output [signal] of the [triggering means] *trigger*, and connected across the output of the rectifying means, for effectively electrically connecting the input terminals of the rectifying means to each other [if a trigger voltage signal is present] *only after and for the alternating current half cycle when the output of the voltage divider has a predetermined fixed percentage value of the rectified alternating current electricity* and for effectively disconnecting the input terminals of the rectifying means from each other [if the trigger voltage signal is not present] *at all other times*;

whereby the relay load is energized by the alternating current electricity source if the sensed ambient light and sensed ambient temperature are both greater than the respective first and second predetermined values, and the relay load is de-energized if the ambient light is below the first predetermined value or if the ambient temperature is below the third predetermined value.

11. A control system as defined in claim 10, further comprising:

J. [indicators] *an indicator*, connected to the output of the electronic switch means, for indicating the ON or OFF state of the relay load.

12. A control system as defined in claim 11, wherein the indicator comprises a resistor and a light emitting diode connected in series, the other connection of the resistor and the light emitting diode connected across the output of the rectifying means.

13. A control system as defined in claim 10, wherein the electronic switching means incorporates a silicon controlled rectifier.

14. A control system as defined in claim 10, wherein the temperature sensing means comprises a thermistor and a potentiometer connected in series with the thermistor, and a second potentiometer connected in parallel to the thermistor and the first potentiometer series combination; and wherein the light control means incorporates a photo-resistor and a potentiometer connected in series and first and second resistors connected in series to each other, their other connections connected in parallel to the series combination of the potentiometer and photo-resistor, so that the potentiometer is adjustable to set the first predetermined value of the light control means.

15. A control system as defined in claim 10, wherein the light control means incorporates an operational amplifier sensing the electrical signal of the light sensing means and generating said ON and said OFF output signal in response to the magnitude of the light sensing output electrical signal and wherein the temperature control means incorporates an operational amplifier sensing at least a portion of the output of the temperature sensing means and incorporating a potentiometer connected to the output of the temperature sensing means at one end and at the other end connected to the output of the operational amplifier wherein one of the inputs of the operational amplifier is connected to the wiper arm of the potentiometer; wherein said potentiometer determines said third predetermined value for which the output signal of the temperature control means is in the OFF state when the ambient temperature falls below said third predetermined value.

16. A control system as defined in claim 10, wherein the voltage regulating means incorporates a zener diode in series with a resistor, and a Darlington transistor pair with the input of the Darlington transistor pair connected to the junction of the zener diode and the resistor, and further incorporating a capacitor for storage of electrical energy connected to the output of the Darlington transistor pair.

17. A control system as defined in claim 10, further comprising:

J. indicators, connected to the output of the light control means, for indicating the ON or OFF states of the electrical control output signal of said light control means.

18. A control method for controlling the energization and de-energization of an external load having a first, OFF, low current state and second, ON, high current state connected in series to an external source of electricity in response to a logical combination of a plurality of sensed parameters, comprising the steps of:

A. rectifying the output of the series combination of the external load and source of electricity for generating an output voltage of uni-polarity;

B. voltage regulating the output voltage of unipolarity at a predetermined value and storing electricity at said predetermined value;

C. individually sensing the parameters [by] *and* generating electrical signals proportional to the magnitude of the corresponding sensed parameter;

D. generating a discrete ON electrical signal if the electrical signal [of the] *generated in response to the* corresponding sensed parameter is greater than a predetermined value and generating a discrete OFF electrical signal if *the electrical signal in response to the corresponding* sensed parameter is below the respective predetermined value;

E. generating a first discrete logic ON electrical signal if the signals of Step D equal a predetermined Boolean equation and generating a second, discrete logic OFF electrical signal if the signals of Step D do not equal the Boolean equation;

F. [generating] *enabling* a trigger [voltage signal] if, and only if, the logic electrical signal is ON, *the trigger when enabled generating an output equal to a fixed percentage of the output voltage of unipolarity*; and G. effectively electrically connecting the outputs of the series combination of the external load and the source of electricity [if a trigger voltage signal is generated] *only after and for the alternating current half cycle when the output of the trigger equals a predetermined value* and effectively disconnecting the [said] outputs from each other [if the trigger voltage signal is not generated] *at all other times*;

whereby the external load is energized by the external source of electricity if the sensed parameters are equal to the predetermined Boolean equation, and the external load is de-energized if the sensed parameters do not equal the Boolean equation.

19. A control system for controlling energization and de-energization of a relay load in series with a source of alternating current electricity in response to ambient light and ambient temperature, so as to selectively override the control of an existing temperature activated switch connected across the series combination of the relay load and the alternating current electricity source, comprising:

A. means, having input terminals connectable across the load within the alternating current electricity source series combination and in parallel with the external temperature activating switch, for rectifying the alternating electricity *from the alternating current electricity source* at a pair of output terminals;

B. light sensing means connectable to a source of direct current electricity, for generating an electrical output signal in proportion to the ambient light level;

C. temperature sensing means, connectable to a source of direct current electricity, for generating an electrical output signal proportional to the ambient temperature;

D. light control means connected to the output of the light sensing means and connectable to a source of direct current electricity, for generating an electrical control output signal of a first, ON, state if the ambient light is above a first predetermined value and a second, OFF, state if the ambient light is below said first predetermined value;

E. temperature control means, connected to the output of the temperature sensing means, and connectable to an external source of direct current electricity, for generating a first, ON, signal if the ambient temperature is above a second predetermined value and a second, OFF, signal if the ambient temperature is below a third predetermined value;

F. control logic means, connected to the output of the light control means and the temperature control means for generating an ON signal if the outputs of the light control means and the temperature control means are both in the ON state and for generating an OFF signal if either the temperature control output signal or the light control output signal is in the OFF state;

G. triggering means, having an input connected to the output of the control logic means, for generating a trigger voltage signal if, and only if, the control logic means output signal is in the ON state; and H. electronic switching means having an input connected to the trigger voltage output signal of the triggering means, and connected across the output of the rectifying means, for effectively electrically connecting the input terminals of the rectifying means to each other if a trigger voltage signal is present and for effectively disconnecting the input terminals of the rectifying means *for each alternating current half cycle* from each other if the trigger voltage signal is not present;

whereby the relay load is energized by the alternating current electricity source if the sensed ambient light and sensed ambient temperature are both greater than the respective first and second predetermined values, and the relay load is de-energized if the ambient light is below the first predetermined value or if the ambient temperature is below the third predetermined value.

*20. A control system for controlling the energization and the de-energization of a load in series with a source of alternating current electricity in response to a parameter comprising:*

*(A) means, having input terminals connected across the load and the alternating current electricity source in series combination, for full-wave rectifying the alternating current electricity at a pair of output terminals;*

*(B) means, connected to the output terminals of the rectifier means for receiving at least a portion of the output of the rectifying means every alternating current half cycle; and*

*(C) means, connected to the output of the voltage receiving means for controlling the energization and the de-energization of the load, said controlling means comprising*

*(1) a trigger having means connected across the output terminals of the fullwave rectifying means, for generating an output that has a fixed, nearly ground voltage when the load is to be de-energized and a voltage equal to a fixed percentage of the voltage across the output terminals of the rectifying means when the load is to be energized, and*

*(2) means, having a gate input connected to the output of the trigger, and connected across the output of the rectifying means, for effectively electrically connecting the input terminals of the rectifying means only for each alternating current half cycle after the output of the trigger obtains a predetermined fixed percentage value, and for effectively disconnecting the input terminals of the rectifying means from each other at all other times.*

*21. A control system for controlling the energization and the de-energization of a load in series with a source of alternating current electricity in response to a parameter comprising:*

*(A) means, having input terminals connected across the load and the alternating current electricity source in series combination, for fullwave rectifying the alternating current electricity at a pair of output terminals;*

*(B) means, connected to the output terminals of the rectifier means for voltage regulating and storing at least a portion of the output of the rectifying means every alternating current half cycle; and*

*(C) means, connected to the output of the voltage regulator and storing means for controlling the energization and the de-energization of the load, said controlling means comprising*

*(1) a trigger having means connected across the output terminals of the fullwave rectifying means, for generating an output that has a fixed nearly ground voltage when the load is to be de-energized and a voltage equal to a fixed percentage of the voltage across the output terminals of the rectifying means when the load is to be energized, and*

*(2) means, having a gate input connected to the output of the trigger, and connected across the output of the rectifying means, for effectively electrically connecting the input terminals of the rectifying means only for each alternating current half cycle after the output of the trigger obtains a predetermined value, and for effectively disconnecting the input terminals of the rectifying means from each other at all other times.*

*22. A control system for controlling the energization and the de-energization of a load in series with a source of alternating current electricity in response to a parameter, comprising:*

*(A) rectifying means having input terminals connected across the load and alternating current electricity source in series combination for rectifying alternating current at a pair of output terminals;*

*(B) voltage regulator means connected to said output terminals of said rectifier means for smoothing and storing at least a portion of the rectified output voltage during every half cycle of alternating current electricity; and*

*(C) means, powered by said voltage regulator means and connected across said rectifying means for selectively energizing and de-energizing said load in response to said parameter, said energizing and de-energizing means comprising*

*across the output terminals of the fullwave rectifying means, for generating an output that has a fixed nearly ground voltage when the load is to be de-energized and a voltage equal to a fixed percentage of the voltage across the output terminals of the rectifying means when the load is to be energized, and*

*(2) means, having a gate input connected to the output of the trigger, and connected across the output of the rectifying means, for effectively electrically connecting the input terminals of the rectifying means only for each alternating current half cycle after the output of the trigger obtains a predetermined value, and for effectively disconnecting the input terminals of the rectifying means from each other at all times.*

*23. A control system for energizing and de-energizing a load in series with a source of alternating current of electricity comprising:*

*A. means, connected across the load and the alternating current electrical source in series combination for fullwave rectifying the alternating current electricity at a pair of output terminals, and, when triggered by a control signal having a fixed percentage value of the voltage across the output terminals, for effectively electrically connecting, during a second period of time, relative to a first period of time, of each half cycle of the alternating current electricity, the load and alternating current electricity source in series combination;*

*(B) means, connected across the output of the rectifying means, for voltage regulating and storing at least a portion of the voltage generated across the output of the rectifying means during said first period of time of each half cycle of the alternating current electricity;*

*(C) means, powered by the voltage regulating and storing means, for generating a control signal to trigger the rectifying and connecting means, said control signal generating means comprising a trigger having means connected across the output terminals of the fullwave rectifying means, for generating a control*

*signal output that has a fixed low voltage when the load is to be de-energized and a voltage equal to a fixed percentage of the voltage across the output terminals of the rectifying means when the load is to be energized.*

*24. A control system for energizing and de-energizing a load in series with a source of alternating current electricity comprising:*

*(A) means, connected across the load and the alternating current electricity source in series combination, for full-wave rectifying the alternating current electricity at a pair of output terminals, and, when triggered by a control signal for generating a fixed percentage value of the voltage across the output terminals, for effectively electrically connecting, during a majority of each half cycle of the alternating current electricity, the load and alternating current electricity source series combination;*

*(B) means, connected across the output of the rectifying means, for voltage regulating and storing at least a portion of the voltage generated across the output of the rectifying means during each alternating current half cycle; and*

*(C) means, powered by the voltage regulating and storing means, for generating the control signal, said control signal generating a means comprising a trigger having means connected across the output terminals of the fullwave rectifying means, for generating a control signal output that has a fixed low voltage when the load is to be de-energized and a voltage equal to a fixed percentage of the voltage across the output terminals of the rectifying means when the load is to be energized.*

*25. A control system for controlling the energization and de-energization of a load in series with a source of alternating current electricity in response to at least two parameters comprising:*

*(A) means, having input terminals connectable across the load and the alternating current electricity source series combination, for rectifying the alternating electricity at a pair of output terminals;*

*(B) means, connected to the output terminals of the rectifying means, for voltage regulating and storing the output of the rectifying means during at least a portion of each alternating current cycle;*

*(C) means, connected to and powered by the output of said voltage regulating and storing means, for generating electrical signals responsive to said parameters;*

*(D) means, each connected to one of the means for generating an electrical signal responsive to a parameter and connected to and powered by the output of the voltage regulating and storing means, for generating electrical control output signals that are of a first, ON, value if the sensed parameter is greater than a predetermined value and are a second, OFF, value, if the sensed parameters are otherwise;*

*(E) means, connected to the output signals of all the means for generating electrical control output signals, and connected to and powered by the output of the voltage regulating storing means for generating a control logic output signal that is of a first, ON, value if and only if all of the output signals of the control signal means are of an ON value, and is a second, OFF, value if any output signal of the control signal means is of an OFF value;*

*(F) a trigger comprising means, connected across the output terminals of the rectifying means, for generating an output controlled by the output of the control logic output signal, so as to have fixed low voltage when the control logic output signal is OFF and a voltage equal to a fractional percentage of the voltage across the output terminals of the rectifying means when the control logic output signal is ON; and*

*(G) means, having an input connected to the trigger, and connected across the output of the rectifying means, for effectively electrically connecting the input terminals of the rectifying means only after and for each alternating current half cycle when the output of the trigger obtains a predetermined value, and for effectively disconnecting the input terminals of the rectifying means from each other at all other times;*

*whereby the voltage regulating and storing means maintains its output voltage so that the load is energized by the alternating current electricity source if the parameters are all greater than their respective selected predetermined values, and the load is de-energized if any of the parameters are not greater than their respective predetermined values.*

* * * * *

UNITED STATES PATENT AND TRADEMARK OFFICE

CERTIFICATE OF CORRECTION

PATENT NO. : RE 31,502

DATED : January 17, 1984

INVENTOR(S) : RICHARD P. GINGRAS

It is certified that error appears in the above-identified patent and that said Letters Patent are hereby corrected as shown below: On the title page:

Please correct Inventor's address from

"40 North Street, Ridgefield, Conn. 06877" to

--14 Black Cherry Lane, Sandy Hook, Conn. 06482--

Signed and Sealed this

Second Day of April 1985

[SEAL]

*Attest:*

DONALD J. QUIGG

*Attesting Officer* *Acting Commissioner of Patents and Trademarks*